US011111685B2

(12) United States Patent
McQueen et al.

(10) Patent No.: US 11,111,685 B2
(45) Date of Patent: Sep. 7, 2021

(54) DEBRIS-FILTER MATERIALS PRINCIPALLY FOR AUTOMATIC SWIMMING POOL CLEANERS

(71) Applicant: Zodiac Pool Systems LLC, Carlsbad, CA (US)

(72) Inventors: E. Keith McQueen, Vista, CA (US); Remi Deloche, Toulouse (FR); Louis Favie, Colomiers (FR)

(73) Assignee: ZODIAC POOL SYSTEMS LLC, Carlsbad, CA (US)

( * ) Notice: Subject to any disclaimer, the term of this patent is extended or adjusted under 35 U.S.C. 154(b) by 0 days.

(21) Appl. No.: 16/806,403

(22) Filed: Mar. 2, 2020

(65) Prior Publication Data

US 2020/0308859 A1    Oct. 1, 2020

Related U.S. Application Data

(60) Provisional application No. 62/823,134, filed on Mar. 25, 2019, provisional application No. 62/844,422, filed on May 7, 2019.

(51) Int. Cl.
  *E04H 4/16* (2006.01)
  *B01D 29/00* (2006.01)
  *E04H 4/12* (2006.01)

(52) U.S. Cl.
  CPC ......... *E04H 4/1645* (2013.01); *E04H 4/1263* (2013.01); *B01D 29/0097* (2013.01)

(58) Field of Classification Search
  CPC ... E04H 4/1645; E04H 4/1263; E04H 4/1654; B01D 29/0097

USPC ............... 210/167.1, 167.16, 167.17; 15/1.7
  See application file for complete search history.

(56) References Cited

U.S. PATENT DOCUMENTS

| 4,105,557 A | * | 8/1978 | Weatherholt | .......... E04H 4/1263 |
|  |  |  |  | 15/1.7 |
| 4,560,418 A |  | 12/1985 | Raubenheimer |  |
| 4,957,630 A | * | 9/1990 | Bratten | ................ B01D 33/067 |
|  |  |  |  | 210/358 |
| 5,028,321 A | * | 7/1991 | Stone | ....................... F04D 13/04 |
|  |  |  |  | 210/167.17 |
| 5,450,644 A | * | 9/1995 | Berman | ................ E04H 4/1636 |
|  |  |  |  | 15/1.7 |
| 5,706,539 A | * | 1/1998 | Fukuda | ................. E04H 4/1654 |
|  |  |  |  | 15/1.7 |

(Continued)

FOREIGN PATENT DOCUMENTS

| AT | 510277 | 3/2012 |
| DE | 3333633 | 3/1984 |
| EP | 2987926 | 2/2016 |

OTHER PUBLICATIONS

International Application No. PCT/US2020/020646, International Search Report and Written Opinion dated Jun. 25, 2020, 11 pages.

*Primary Examiner* — Fred Prince
(74) *Attorney, Agent, or Firm* — Kilpatrick Townsend & Stockton LLP; Dean W. Russell

(57) ABSTRACT

Debris filters for automatic swimming pool cleaners may be formed of metal, carbon fibers, or composites more rigid than soft nylon bags. In at least one version, the filter may be made of, or include, steel or stainless steel. Non-uniform sizes, densities, and/or shapes of openings in the filtration material may be created to provide different levels of filtration in a single device.

10 Claims, 2 Drawing Sheets

(56) References Cited

U.S. PATENT DOCUMENTS

| | | | |
|---|---|---|---|
| 6,352,645 B1 * | 3/2002 | Wilfong | B01D 29/15 210/767 |
| 8,393,030 B2 | 3/2013 | Pichon et al. | |
| 8,784,652 B2 | 7/2014 | Rief et al. | |
| 9,909,334 B2 | 3/2018 | Maggeni et al. | |
| 2014/0014140 A1 | 1/2014 | Correa | |

* cited by examiner

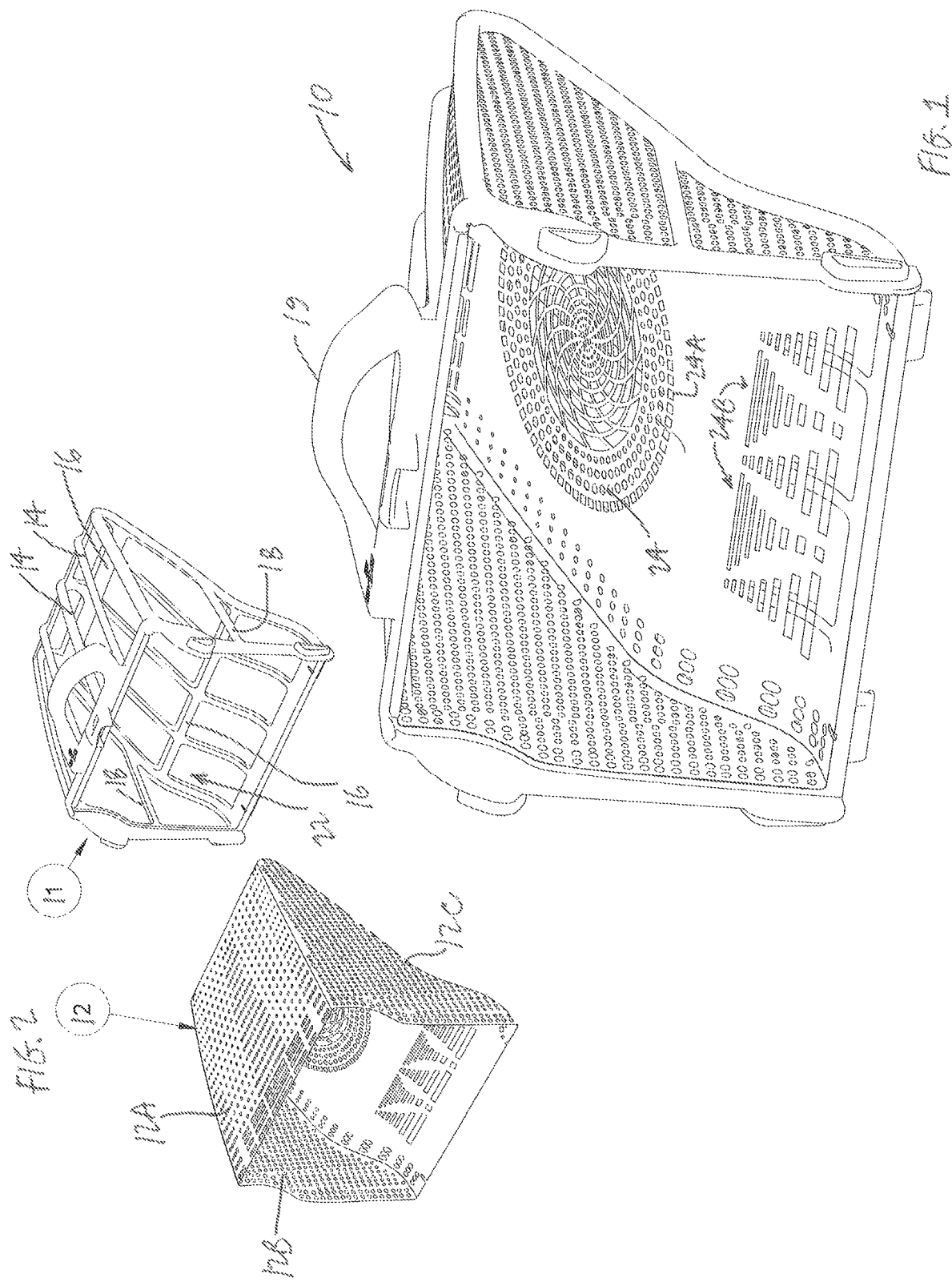

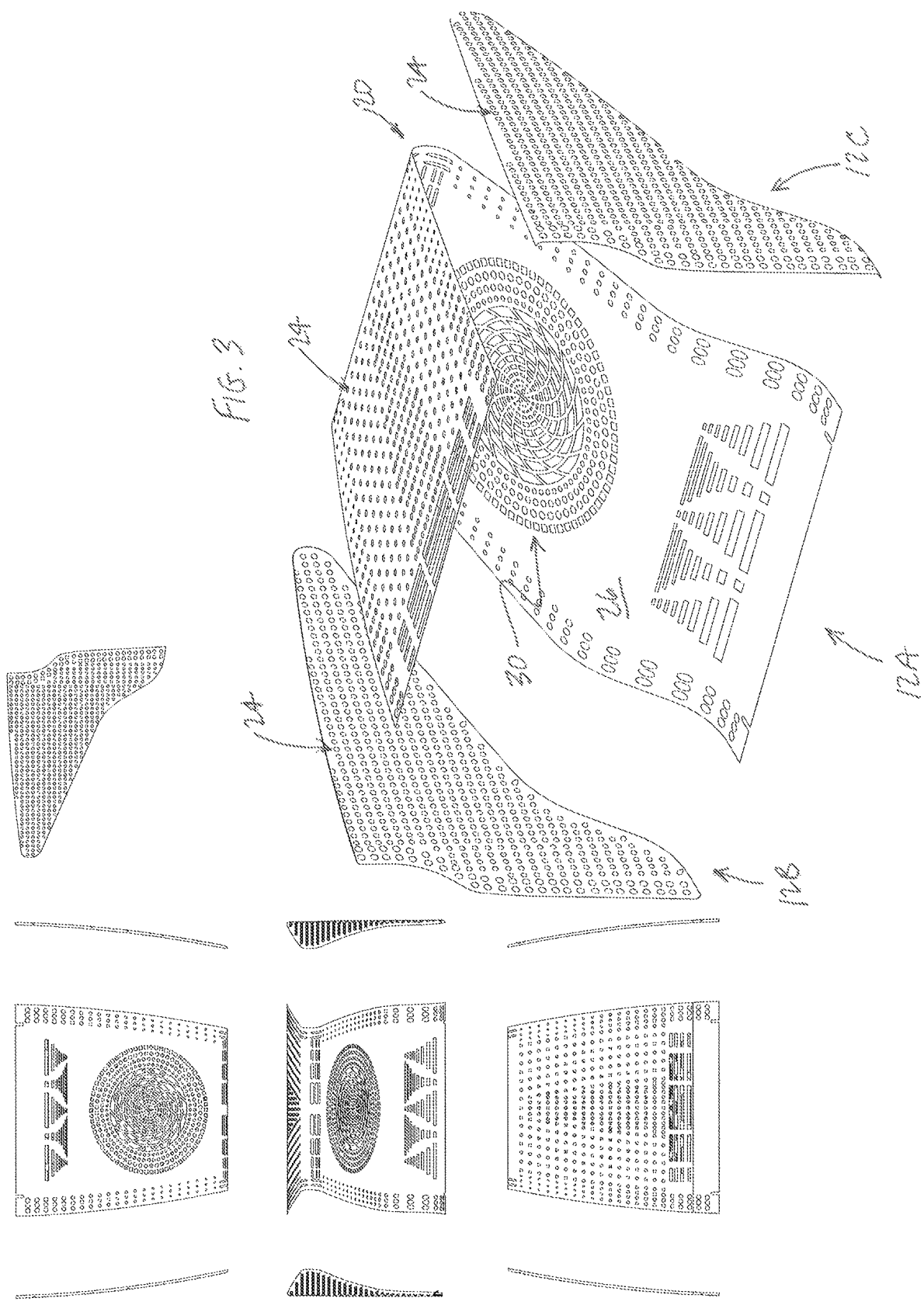

DEBRIS-FILTER MATERIALS PRINCIPALLY FOR AUTOMATIC SWIMMING POOL CLEANERS

CROSS-REFERENCE TO RELATED APPLICATIONS

This application claims the benefit of and priority to (1) U.S. Provisional Patent Application Ser. No. 62/844,422, filed May 7, 2019, and (2) U.S. Provisional Patent Application Ser. No. 62/823,134, filed Mar. 25, 2019, the entire contents of both of which provisional applications are hereby incorporated herein by this reference.

FIELD OF THE INVENTION

This invention relates to cleaners of water-containing vessels such as swimming pools or spas and more particularly, although not necessarily exclusively, to materials used to construct debris filters for cleaners configured to move autonomously within the vessels.

BACKGROUND OF THE INVENTION

Automatic swimming pool cleaners (APCs) are well known. These cleaners often are categorized as either "hydraulic" or "robotic" (or "electric"), depending on the source of their motive power. Hydraulic cleaners, for example, typically use pressurized (or depressurized) water to effect their movement within pools, whereas robotic cleaners typically utilize an electric motor to cause their movement. Moreover, hydraulic cleaners frequently are sub-categorized as either "pressure-side" or "suction-side" devices, with pressure-side cleaners receiving pressurized water output from an associated water-circulation pump and suction-side cleaners, by contrast, being connected to an inlet of the pump.

Suction-side APCs conventionally lack any on-board debris filters, instead allowing the debris to pass through their bodies, through connecting hoses, to fixed-location filters associated with the water-circulation system of the pool. Pressure-side and robotic cleaners generally include debris filters that move together with the cleaners: Filters of pressure-side APCs frequently are positioned externally of, but are attached to, the cleaner bodies, whereas debris filters of robotic cleaners often are positioned within the cleaner bodies.

As noted in U.S. Pat. No. 8,784,652 to Rief, et al., these debris filters conventionally are "flexible nylon bags typically made from a soft material." See Rief, col. 2, ll. 19-20. Although the Rief patent discusses using a "rigid debris-collection canister," see id., col. 3, ll. 18-19, the rigid canister contains a seemingly conventional soft "fine-mesh container" or "fine mesh insert" in order "to entrap fine debris" therein. See id., col. 6, ll. 58-60; col. 7, ll. 12-15.

U.S. Pat. No. 9,909,334 to Maggeni, et al., details a robotic APC having an internal filter. According to the Maggeni patent, the filter "can be made of any flexible or non-flexible filtering material" including "woven fiber mesh, non-woven mesh, polymer, textile, paper, or combinations." See Maggeni, col. 6, ll. 47-49. The filter also is described as comprising "fabric." See id., l. 33.

The soft materials disclosed in the Rief and Maggeni patents generally perform satisfactorily in APCs, but are not without disadvantages. When formed as bags, for example, the soft materials "have a tendency to be caught under the cleaner wheels and be damaged." See Rief, col. 2, ll. 20-21. They also are susceptible to tearing, chemical damage, and being improperly installed on APCs. See id., ll. 22-25. Further, states the Rief patent, external flexible bags may "act like sails" in the pool and "are a hindrance to pool-cleaner movement," and because the bags are collapsible, they often are hard to clean. See id., ll. 28 and 32-33.

SUMMARY OF THE INVENTION

The present invention seeks to provide debris filters for APCs that resolve some or all of these issues. In particular, filters of the present invention may be formed of metal, carbon fibers, or composites more rigid than soft nylon bags. In at least one version, the filter may be made of, or include, steel or stainless steel.

In some cases, filters of the present invention could be made of connected strands of, e.g., metal so as to form a mesh. Beneficially, however, a solid sheet of, e.g., metal may be screened, etched, punched, stamped, or stenciled so as to remove portions of the sheet and thus simulate a mesh. Such activities advantageously may be performed chemically, although mechanical or other approaches (e.g. laser cutting or die cutting) conceivably may be used instead.

For example, a screen including solid areas and holes and resistant to a particular chemical substance may be placed atop the solid sheet of metal (which, by contrast, may be corroded or etched by the chemical substance). The chemical substance may then be applied to the screen, whose solid areas will block transfer of the substance to the metal sheet and whose holes will allow transfer of the substance to the metal sheet. The transferred chemical substance will corrode or etch the metal sheet, producing openings in it aligned with the holes of the screen.

In one version of a metal sheet, multiple openings each having size of approximately 0.2 mm may be formed. Openings of this size are compatible with water-filtration requirements for most APCs. The process allows for formation of openings of different sizes, however, merely by changing the screen. As well, screens could be used in which their holes themselves are different sizes (and/or shapes), hence producing non-uniform openings in the metal sheet. Screens alternatively or additionally may include different densities of openings.

Incorporating non-uniform openings into a sheet allows for "evolutive" filtering to occur. Utilizing sheets such as these, different regions of a filter may provide different levels of filtration for the debris-laden water they encounter. For example, relatively dirty water may be directed to regions providing coarser filtration, while cleaner water may be directed to regions providing finer filtration. Hence, a single filter may perform two or more levels of filtration in use, potentially avoiding any need for a separate pre-filter or second filtering device.

Because metals typically have greater rigidity that soft nylon bags, for example, forming such a metal filter also may produce a structure that is less likely to collapse than is a nylon bag. The enhanced rigidity of the metal filter additionally may reduce the amount of rigid framing otherwise needed to create a hybrid mesh/frame object, and the metal filter may be more durable and less likely to tear or be subject to corrosion because of chemicals present in pool water or solar radiation. At least some filters may include both metal and fabric if appropriate or desired. Alternatively or additionally, semi-rigid or rigid plastics conceivably could be included.

It thus is an optional, non-exclusive object of the present invention to provide debris filters formed of or including metal, carbon fibers, or composite materials.

It is another optional, non-exclusive object of the present invention to provide debris filters, at least portions of which are created from a solid sheet of material into which openings have been formed.

It is a further optional, non-exclusive object of the present invention to provide debris filters whose openings are not uniform in size, shape, or both size and shape.

It is also an optional, non-exclusive object of the present invention to provide debris filters including solid sheets of metal that have been treated chemically to create openings.

It is, moreover, an optional, non-exclusive object of the present invention to provide debris filters in which sheets with openings are attached to framing for use in or with APCs.

Other objects, features, and advantages of the present invention will be apparent to persons skilled in the relevant fields with reference to the remaining text and the drawings of this application.

BRIEF DESCRIPTION OF THE DRAWINGS

FIG. 1 is a perspective view of an exemplary debris filter of the present invention.

FIG. 2 is an exploded view of primary components of the debris filter of FIG.

FIG. 3 is an exploded view of an exemplary metal sheets useful to form a primary component of the debris filter of FIGS. 1-2.

DETAILED DESCRIPTION

Illustrated in FIG. 1 is an exemplary debris filter 10 of the present invention. Debris-laden water may enter filter 10, with filter 10 stopping some of the debris before allowing the (filtered) water to exit. Filter 10 is designed for use within an APC, although it conceivably may be employed for other purposes. At least some versions of filter 10 may (but need not necessarily) resemble and function like the filtering device of U.S. Pat. No. 8,393,030 to Pichon, et al.

As shown principally in FIG. 2, filter 10 may include frame 11 and mesh 12. Frame 11 preferably is sufficiently rigid to retain its shape at all times and typically (but not necessarily) is molded or otherwise formed of plastic material. FIGS. 1-3 depict frame 11 as having a particular complex shape, although other complex or non-complex shapes may be devised instead. In some instances frame 11 may comprise integrally-molded main longitudinal and lateral support beams 14 and 16, respectively, as well as additional support beams 18 and handle 19, for example.

Some or all of mesh 12 may be formed of fabric or other conventional materials, in which case the term "mesh" may be used in the standard sense of being an interwoven or intertwined structure. Preferably, however, mesh 12 is a structure formed by one or more sheets of metal (or other material) and not interwoven or intertwined. Preferred mesh 12 thus may be said to simulate conventional "mesh," as noted earlier in this application.

FIG. 3 illustrates one version of mesh 12 formed by three pieces of metal such as (but not limited to) steel or stainless steel. Central portion 12A is shown as bent at vertex 20 to form a shape approximating that of interior 22 of frame 11. Mesh 12 additionally may include side portions 12B-C.

In some versions of filter 10, portions 12A-C may be connected together—as shown in FIG. 2—before being attached to frame 11. Portions 12A-C need not necessarily be interconnected, however, and instead may be attached only to frame 11. Likewise, mesh 12 need not necessarily be formed by three pieces of material, as more or fewer pieces may be employed. Additionally, mesh 12 may be attached to either the interior or exterior of frame 11 in any appropriate manner, including (but not limited to) overmolding frame 11 onto mesh 12 or gluing the two components together.

A multiplicity of openings 24 in sheets of mesh 12 are depicted in FIGS. 1-3. Openings 24 may be of any desired shapes, sizes, and densities. As illustrated, for example, side portions 12B-C contain openings 24 that are substantially circular and uniformly distributed. By contrast, central portion 12A may, if desired, contain both these types of openings 24 as well as generally square openings 24A and generally rectangular openings 24B distributed in various patterns (including, for example, annular and spiral patterns). Clear from central portion 12A is that the openings 24 need not be uniformly distributed about a sheet, and indeed that significant areas (e.g., area 26) of the sheet may remain solid or have few openings 24. Accordingly, filter 10 may provide "evolutive" filtering of fluid, with different levels of filtration occurring depending on whether debris-laden fluid encounters an area such as area 26, in which few openings 24 exist, or an area such as area 30, in which many openings 24 are present. Placement, sizes, and shapes of openings 24 additionally may facilitate overmolding of frame 11 onto mesh 12 by providing regions of greater or lesser support, for example.

Exemplary concepts or combinations of features of the invention may include:

A. A debris filter formed of or including metal, carbon fibers, or composite materials.

B. An APC including a filter formed of or including metal, carbon fibers, or composite materials.

C. An APC including a metal mesh filter.

D. A metal mesh filter formed from a solid sheet of material.

E. A metal mesh filter formed from a solid sheet of metal by applying a corrosive chemical to a screen placed atop the metal sheet.

F. A metal mesh filter whose opening sizes, densities, and/or shapes are non-uniform.

G. A filter for an APC comprising a frame and mesh attached to the frame, with the mesh comprising at least one integrated sheet of material in which openings have been created.

H. A filter for an APC comprising a metal mesh to which a frame is attached by overmolding or gluing.

These examples are not intended to be mutually exclusive, exhaustive, or restrictive in any way, and the invention is not limited to these example embodiments but rather encompasses all possible modifications and variations within the scope of any claims ultimately drafted and issued in connection with the invention (and their equivalents). For avoidance of doubt, any combination of features not physically impossible or expressly identified as non-combinable herein may be within the scope of the invention.

The entire contents of the Rief, Maggeni, and Pichon patents are incorporated herein by this reference. Further, although applicant has described filters for use with APCs, persons skilled in the relevant field will recognize that the present invention may be employed in other devices such as (but not limited to) manual pool cleaners. Finally, references to "pools" and "swimming pools" herein may also refer to spas or other water containing vessels used for recreation or therapy and for which cleaning is needed or desired.

What is claimed is:

1. A debris filter for an automatic swimming pool cleaner comprising at least one solid sheet of metal in which openings have been created and a frame to which the sheet of metal is attached.

2. A debris filter for an automatic swimming pool cleaner comprising a solid sheet of metal in which openings of non-uniform size, shape, or density have been created.

3. A debris filter according to claim 2 in which (a) the sheet of metal comprises first and second regions and (b) at least some of the openings in the first region are of different size than at least some of the openings in the second region.

4. A debris filter according to claim 3 further comprising a frame and in which the sheet of metal is attached to the frame by overmolding or gluing.

5. A debris filter for an automatic swimming pool cleaner comprising at least one solid sheet of metal in which openings have been created by applying a corrosive chemical to a screen placed atop the sheet of metal.

6. A debris filter for an automatic swimming pool cleaner formed of or including a sheet of metal, carbon fibers, or composite materials, with the sheet comprising first and second regions, each of the first and second regions including a plurality of openings, with the plurality of openings included in the first region being of different size than the plurality of openings included in the second region.

7. An automatic swimming pool cleaner comprising:
 a. a source of motive power for movement within a swimming pool; and
 b. a debris filter comprising:
  i. a frame sufficiently rigid to retain its shape in use; and
  ii. a mesh (A) attached to the frame and (B) comprising at least one sheet of metal defining first and second regions in which openings exist, with at least some openings of the first region differing in size, shape, or density from at least some openings of the second region.

8. A method of cleaning a swimming pool, comprising:
 a. introducing into the swimming pool an automatic swimming pool cleaner comprising a debris filter comprising at least one solid sheet of metal in which openings have been formed; and
 b. causing water of the swimming pool to enter the debris filter through the openings for filtering and thereafter to exit the debris filter to return, directly or indirectly, to the swimming pool.

9. A method according to claim 8 in which the openings are of non-uniform size, shape, or density.

10. A method according to claim 9 in which the at least one solid sheet of metal defines first and second regions, with at least some openings of the first region differing in size from at least some openings of the second region.

* * * * *